United States Patent
Kwong et al.

(10) Patent No.: US 10,496,363 B2
(45) Date of Patent: Dec. 3, 2019

(54) VOICE USER INTERFACE FOR DATA ACCESS CONTROL

(71) Applicant: T-Mobile USA, Inc.

(72) Inventors: Samson Kwong, Bellevue, WA (US);
Peter Myron, Renton, WA (US);
Michael Mitchell, North Bend, WA (US)

(73) Assignee: T-Mobile USA, Inc., Bellevue, WA (US)

(*) Notice: Subject to any disclaimer, the term of this patent is extended or adjusted under 35 U.S.C. 154(b) by 218 days.

(21) Appl. No.: 15/625,007

(22) Filed: Jun. 16, 2017

(65) Prior Publication Data

US 2018/0364975 A1    Dec. 20, 2018

(51) Int. Cl.
*G06F 3/16* (2006.01)
*G06F 3/0484* (2013.01)
(Continued)

(52) U.S. Cl.
CPC .......... *G06F 3/167* (2013.01); *G06F 3/04847* (2013.01); *G06T 11/206* (2013.01);
(Continued)

(58) Field of Classification Search
CPC .... G06F 3/167; G06F 3/04847; G06T 11/206; G10L 13/00; G10L 15/22; G10L 15/30;
(Continued)

(56) References Cited

U.S. PATENT DOCUMENTS

| | | |
|---|---|---|
| 5,835,565 A | 11/1998 | Smith et al. |
| 8,494,140 B2 | 7/2013 | Younger et al. |

(Continued)

FOREIGN PATENT DOCUMENTS

WO    0033552 A1    6/2000

OTHER PUBLICATIONS

Non-Final Office Action for U.S. Appl. No. 15/625,028, dated Nov. 16, 2017, 56 pages.
(Continued)

*Primary Examiner* — Sonia L Gay
(74) *Attorney, Agent, or Firm* — Han Santos, PLLC

(57) ABSTRACT

A voice user interface (VUI) may be deployed for accessing data that are stored in databases of a telecommunications network. A voice command received at a voice interface device connected to a telecommunications network may be converted into a persistent data representation via a speech interpretation engine. The persistent data representation is sent to an intent mapping service that maps persistent data representations to intermediate command representations. In turn, a command interpreter of the telecommunications network may receive the intermediate command representation from the intent mapping service. The command interpreter may translate the intermediate command representation into a database function command via a command interpreter of the telecommunications network. The database function command may be executed on data stored in a database of the telecommunications network via a database interface to generate at a synthesized speech output presented by the voice interface device or a visual output presented by a display device.

20 Claims, 8 Drawing Sheets

(51) Int. Cl.
*G06T 11/20* (2006.01)
*G10L 13/00* (2006.01)
*G10L 15/22* (2006.01)
*G10L 15/30* (2013.01)
*H04M 1/725* (2006.01)
*H04M 3/22* (2006.01)
*H04W 24/00* (2009.01)

(52) U.S. Cl.
CPC .............. *G10L 13/00* (2013.01); *G10L 15/22* (2013.01); *G10L 15/30* (2013.01); *H04M 1/72522* (2013.01); *H04W 24/00* (2013.01); *G10L 2015/223* (2013.01); *H04M 3/2263* (2013.01); *H04M 2201/40* (2013.01); *H04M 2203/256* (2013.01)

(58) Field of Classification Search
CPC ........ G10L 2015/223; H04M 1/72522; H04M 3/2263; H04M 2201/40; H04M 2203/256; H04W 24/04
See application file for complete search history.

(56) References Cited

U.S. PATENT DOCUMENTS

| | | |
|---|---|---|
| 9,728,188 B1 | 8/2017 | Rosen et al. |
| 2003/0009306 A1 | 1/2003 | Fang |
| 2003/0083875 A1 | 5/2003 | Brown et al. |
| 2003/0154080 A1 | 8/2003 | Godsey et al. |
| 2003/0185232 A1 | 10/2003 | Moore et al. |
| 2004/0085297 A1 | 5/2004 | Stivers et al. |
| 2004/0143440 A1 | 7/2004 | Prasad et al. |
| 2005/0027539 A1 | 2/2005 | Weber et al. |
| 2008/0146291 A1 | 6/2008 | Huisken |
| 2008/0154608 A1 | 6/2008 | Evermann et al. |
| 2009/0177477 A1 | 7/2009 | Nenov et al. |
| 2009/0204410 A1 | 8/2009 | Mozer et al. |
| 2012/0271639 A1 | 10/2012 | Hanson |
| 2012/0278072 A1 | 11/2012 | Park et al. |
| 2013/0120123 A1 | 5/2013 | Aman et al. |
| 2013/0304466 A1 | 11/2013 | Caldwell et al. |
| 2014/0274203 A1* | 9/2014 | Ganong, III ...... H04W 52/0251 455/556.1 |
| 2014/0365215 A1 | 12/2014 | Kim |
| 2015/0019216 A1* | 1/2015 | Singh .................... G10L 15/183 704/235 |
| 2016/0219078 A1* | 7/2016 | Porras ................... G06F 3/0484 |
| 2016/0358603 A1 | 12/2016 | Azam et al. |
| 2016/0379632 A1* | 12/2016 | Hoffmeister ............ G10L 15/18 704/253 |
| 2017/0025124 A1 | 1/2017 | Mixter et al. |
| 2017/0048118 A1* | 2/2017 | Choi ..................... H04L 43/062 |
| 2017/0256260 A1 | 9/2017 | Jeong |
| 2018/0210633 A1* | 7/2018 | Grochocki, Jr. ..... G09B 29/007 |
| 2018/0329993 A1* | 11/2018 | Bedadala ................ G10L 15/22 |

OTHER PUBLICATIONS

Final Office Action for U.S. Appl. No. 15/625,028 dated Apr. 2, 2018, 35 pages.
International Search Report and Written Opinion for PCT Application No. PCT/US2018/036570 dated Sep. 27, 2018, 12 pages.
International Search Report and Written Opinion for PCT Application No. PCT/US2018/036764, dated Oct. 2, 2018, 12 pages.
Non-Final Office Action for U.S. Appl. No. 15/625,028, dated Oct. 3, 2018, 23 pages.

* cited by examiner

US 10,496,363 B2

VOICE USER INTERFACE FOR DATA ACCESS CONTROL

BACKGROUND

Mobile devices are integral to the daily lives of most users. Mobile devices are used to make voice calls, check email and text messages, update social media pages, stream media, browse websites, and so forth. As a result, users of mobile devices expect a wireless telecommunication carrier to provide constant and reliable telecommunication and data communication services at all times.

The reliability of telecommunication and data communication services may be affected by multiple factors, such as geography and terrain, device features and capabilities, as well as network infrastructure and network coverage deployment. Thus, an operator of the wireless carrier network may monitor performance or perform analytic tests on the various network components of the wireless carrier network, as well as hardware and software components of user devices to generate key performance indicators (KPIs), device and application metrics, quality of experience (QoE) measurements, and/or so forth. Such performance data may be visually displayed on a dashboard application. The performance monitoring or analytic tests may be performed on a continuous or recurring basis to ensure that modifications and updates to components do not degrade the performance of the wireless carrier network.

However, due to the sheer volume of the test results that are generated, engineers and representatives working for the wireless carrier network may have difficulty navigating through the dashboard application to view the desired test results in an efficient manner. Furthermore, in the event that the performance data displayed by the dashboard application indicates a malfunction, a network engineer or device engineer of the wireless carrier network may have to use a different software or system to troubleshoot and fix the malfunction.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
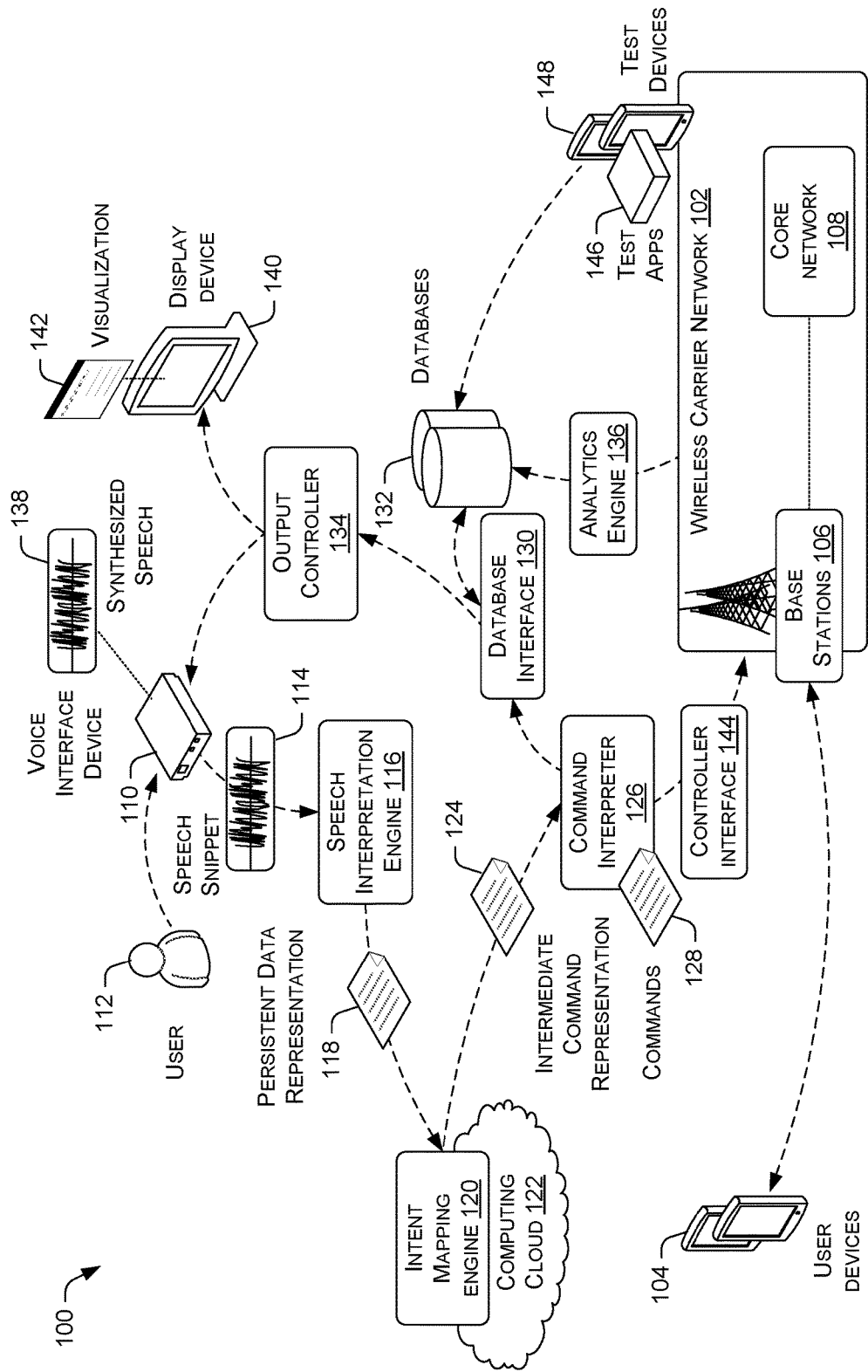
FIG. 1 illustrates an example architecture of a voice user interface for data access and voice command control of network components in a wireless carrier network.

This disclosure is directed to techniques for deploying a voice user interface (VUI) for data access and voice command control of network components in a wireless carrier network. The VUI may include a voice interface device that is deployed as a part of the wireless carrier network. The voice input device may capture the spoken speech of a user via a microphone or other transducer for interpretation for conversion into a persistent data representation. In some embodiments, a speech interpretation engine in the form of a speech-to-text engine may convert the captured spoken speech into a persistent data representation in the form of a textual representation. In other embodiments, the spoken speech may be converted into another form of persistent data representation, such as a sound pattern of phonemes, by a different speech interpretation engine. The persistent data representation is then sent to an intent mapping engine that is operating on a computing cloud. The computing cloud may be operated by a third-party service provider, or alternatively may be implemented locally on a private cloud.

The intent mapping engine may use mapping rules that are provided by the wireless carrier network to map the persistent data representation to an intermediate command representation of multiple intermediate command representations. The intermediate command representations are not actual commands for accessing databases or controlling network components of the wireless carrier network. Instead, they are representations that are defined by the wireless carrier network to represent those commands, but whose command definitions are unknown to the intent mapping engine. The mapping rules provided by the wireless carrier network to the intent mapping engine may be periodically updated. Such measures may provide additional security by ensuring that an operator of the intent mapping engine is not directly aware of the intended functionalities of the commands that are being mapped with respect to the wireless carrier network.

The intermediate command representation that corresponds to the persistent data representation may be sent by the intent mapping engine to a command interpreter of the wireless carrier network. In turn, the intermediate command representation may be interpreted by the command interpreter into a database function command for data stored in databases of the wireless carrier network. Alternatively, the intermediate command representation may be interpreted by the command interpreter into an action command for controlling network components and/or associated devices of the wireless carrier network.

The database function command may cause a database interface to process and/or retrieve data from the databases of the wireless carrier network for presentation. For example, the processing of the data may include cross referencing data in multiple data bases or applying a statistic algorithm on a particular set of data. The presentation may be in the form of synthesized speech that is outputted by an audio speaker of the voice interface device. Alternatively or concurrently, the presentation of the data or the processed data may take the form of data visualization that is presented on a display device. The action command may cause network components or associated devices of the wireless carrier network to perform tasks. For example, the tasks may include stopping and restarting a network component or initiating software testing for an application that is installed on multiple testing devices. Some of the tasks may include presenting information via synthesized speech that is outputted by the voice interface device and/or data visualization that is presented via a display device.

The use of VUI for data access and voice command control of network components in a wireless carrier network may benefit network engineers, management staff, marketing staff, and customer service representatives of the wireless carrier network. For example, the use of VUI may enable these personnel to understand operational details and performance metrics regarding the wireless carrier network efficiently, as well as initiate troubleshooting and remediation of network errors, without having to acquire, customize, and/or learn the use of complex troubleshooting and dashboard software tools. In this way, personnel of the wireless carrier network are able to quickly acquire the precise pieces of information they desire for reporting and troubleshooting purposes. Additionally, in some scenarios, the marketing staff may use information that are provided by the VUI to gauge the stability of the wireless carrier network for launching a product or service. As a result, the use of VUI may reduce computation load on the servers of the wireless carrier network by eliminating unnecessary collection, processing, and display of data, unwanted termination and re-initialization of network processes and components, and/or so forth. In some instances, selective access to the VUI may also be provided to customers to enable customers to obtain customer account information or certain network status updates regarding the wireless carrier network. The techniques described herein may be implemented in a number of ways. Example implementations are provided below with reference to the following figures.

Example Architecture

FIG. 1 illustrates an example architecture 100 of a voice user interface (VUI) for data access and voice command control of network components in a wireless carrier network 102, which is a form of a telecommunications network. The wireless carrier network 102 may provide a wide range of mobile communication services, as well as ancillary services and features, to subscribers and associated mobile device users. In various embodiments, the wireless carrier network 102 may provide wireless communication between multiple user devices. Further, the wireless carrier network 102 may also provide communications between the multiple user devices, such as the user devices 104, and other user devices that are serviced by other telecommunications networks. In various embodiments, the user devices may include mobile handsets, smart phones, tablet computers, personal digital assistants (PDAs), smart watches, and/or electronic devices.

The wireless carrier network 102 may be implemented using multiple interconnected networks. In various embodiments, the wireless carrier network 102 may include multiple Radio Access Networks (RANs). The RANs may be connected to each other via regional ground networks. In turn, the regional ground networks may be connected to a core network by a wide area network (WAN). Each regional portion of the wireless carrier network 102 may include one or more RANs and a regional circuit and/or packet switched network and associated signaling network facilities. The wireless carrier network 102 may provide telecommunication and data communication in accordance with one or more technical standards, such as Enhanced Data Rates for GSM Evolution (EDGE), Wideband Code Division Multiple Access (W-CDMA), High Speed Packed Access (HSPA), Long Term Evolution (LTE), CDMA-2000 (Code Division Multiple Access 2000), and/or so forth. In some embodiments, the core network of the wireless carrier network 102 may accessed via wired or wireless local area networks (LANs). For example, a wireless local area network may be a network that is established using Wi-Fi or Bluetooth standards and hardware.

A RAN of the wireless carrier network 102 may include a number of base stations 106. In some embodiments, the base stations 106 may be in the form of nodes. Each node may include a base transceiver system (BTS) that communicates via an antennae system over an air-link with one or more user devices that are within range. The BTS may send radio communication signals to user devices and receive radio communication signals from user devices. The RANs may carry the communications of the user devices between the respective base stations 106 and the core network 108. The core network 108 may connect to a public packet data communication network, such as the Internet. Data and voice communications via the RANs, the core network 108, and the Internet may support a variety of services through the wireless carrier network 102.

In various embodiments, 2G and/or 3G network components of the wireless carrier network 102 may include a serving GPRS support node (SGSN) that routes voice calls to and from the public switched telephone network (PSTN), a Gateway GPRS Support Node (GGSN) that handles the routing of data communication between external packet switched networks and the core network 108. The network components may further include a Packet Data Network (PDN) gateway (PGW) that routes data traffic between the GGSN and the Internet. The LTE components of the wireless carrier network 102 may include an Evolved Packet Core (EPC) and an IP multimedia Subsystem (IMS) core.

The architecture 100 may include a voice interface device 110 that is deployed by the wireless carrier network 102. Alternatively, the voice interface device 110 may be communicatively connected to the wireless carrier network 102 via a wired or wireless local area network (LAN). The voice interface device 110 may be a networked information appliance that includes a microphone or other transducer for receiving voice inputs, audio speakers for generating audio outputs. The voice interface device 110 further includes signal processing components for converting audio into digital data, and vice versa, and network interface components for send and receiving digital data to other devices via a network. In some instances, the voice interface device 110 may be a smart speaker that is configured to provide virtual assistant functionalities. In operation, the voice interface device 110 may receive a speech input that is spoken by a user 112. The speech input may contain a command for accessing data stored in databases of the wireless carrier network 102 or control components and associated devices of the network. The speech input is converted by voice interface device 110 into a digital speech snippet 114. In turn, the digital speech snippet 114 is transmitted by the voice interface device 110 to a speech interpretation engine 116. In various embodiments, the speech interpretation engine 116 may be a service that is operated by the wireless carrier network 102 or a third-party service provider.

In some embodiments, the speech interpretation engine 116 may be a speech-to-text engine that uses a speech conversion algorithm to convert the digital speech snippet 114 into a persistent data representation 118 that is in the form of a textual representation. In other embodiments, the speech interpretation engine 116 may directly convert the digital speech snippet 114 into a persistent data representation 118 in the form of a sound pattern of phonemes. The persistent data representation 118 is then transmitted by the speech interpretation engine 116 to an intent mapping engine 120 that is executing on a computing cloud 122. In alternative embodiments, the computing cloud 122 may be substituted with one or more localized computing devices. The persistent data representation 118 may be transmitted to the computing cloud 122 via a network. In various embodiments, the network may include a local area network (LAN), a larger network such as a wide area network (WAN), or a collection of networks, such as the Internet. The computing cloud 122 uses a network-based infrastructure to provide shared computer processing resources and data to computers and other devices on demand. In various embodiments, the intent mapping engine 120 may use natural language processing (NLP) algorithms to discern the intent contained in the persistent data representation 118. The NLP may use techniques such as morphological segmentation, part-of-speech tagging, word segmentation, named entity recognition (NER) to parse the language contained in the persistent data representation 118 into speech entities that include semantics, concepts, nouns, etc. The speech entities are then mapped by the intent mapping engine 120 into intermediate command representations 122 based on mapping rules that are provided by the wireless carrier network 102. The intermediate command representation 124 may be selected from multiple intermediate command representations.

In various embodiments, the intermediate command representations are not actual commands for accessing databases or controlling network components of the wireless carrier network 102. Instead, they are representations that are defined by the wireless carrier network 102 to represent those commands, but whose command definitions are unknown to the intent mapping service provider that operates the intent mapping engine 120. In other words, the intent mapping service provider may have no prior knowledge of the command definitions. For example, the intermediate command representation 124 may be perform process "apple" on "green" and "blue", in which "apple" correlates to a data function command of "cross referencing," "green" is a customer account database of the wireless carrier network 102, and "blue" is an equipment upgrade eligibility database. However, the intent mapping service provider that operates the intent mapping engine 120 does not know that "apple" correlates to the data function command of "cross referencing," "green" is the customer account database, and "blue" is an equipment upgrade eligibility database.

In another example, the intermediate command representation 124 may indicate an intent to perform "orange" on "red," in which "orange" is the application of a statistical algorithm and "red" is a database that contains QoE data for a set of user devices that are running an application. In such an example, the intent mapping service provider that operates the intent mapping engine 120 has no knowledge that "orange" correlates to a data function command of "applying a statistical algorithm" and "red" is the QoE database. In an additional example, the intermediate command representation 124 may indicate an intent to perform "peach" on "yellow," in which the process "peach" is rebooting and "yellow" is a network device of the wireless carrier network 102. However, the intent mapping service provider that operates the intent mapping engine 120 has no knowledge that "peach" correlates to the action of command of rebooting, and "yellow" correlates to the network device.

The intermediate command representation 124 may be transmitted by the intent mapping engine 120 via a network to a command interpreter 126 of the wireless carrier network 102. In turn, the command interpreter 126 may translate the intermediate command representation 124 into a command 128 using intent translation rules stored in a translation database. In some embodiments, the command 128 may be a database function command that acts on data stored in the one or more databases 130 to generate an output. The databases 130 may include one or more databases, such as relational databases, object databases, object-relational databases, key-value databases. The databases 130 may store various types of data, such as device data, network data, and account data. The device data may indicate the technical capabilities, feature settings, and operational statuses of user devices that are using the telecommunication services provided by the wireless carrier network 102. For example, device data for a particular user device may indicate that Wi-Fi calling is enabled on the user device or that the user device is capable of using a specific communication band provided by the wireless carrier network. In other examples, the device data for the particular user device may indicate that Wi-Fi calling is disabled on the user device, a developer mode is active on the user device, a location tracking service is active on the user device, and/or so forth.

The network data may include information regarding the technical and operational status of the wireless carrier network. For example, network data of the network may indicate that Long-Term Evolution (LTE) spectrum coverage (or other spectrum coverage) is unavailable in a particular geographical area or that a network node was temporarily overwhelmed with network traffic at a particular time due to a major event. The account data may include account details of multiple users, such as account type, billing preferences, service plan subscription, payment history, data consumed, minutes of talk time used, and/or so forth of each user. For example, the account data of a particular user may indicate that the user has a postpaid account and that the user is current with payments for the subscribed service plan.

In other embodiments, the data may include metrics data (e.g., KPIs, QoE indicators, power consumption indicators, etc.) on the performance of network hardware and software components of the wireless carrier network 102, including metric data on applications that are executing on user devices of network subscribers. The metrics data may be collected by analytics engine 136 that is responsible for collecting metrics from the components of the wireless carrier network 102. In some instances, the analytics engine 136 may periodically or upon user input initiate testing or diagnostics routines on the components in order to monitor component and device performance. In additional embodiments, the data may include diagnostic test data that are generated by testing devices that are configured to use the telecommunication services provided by the wireless carrier network 102. The testing devices may be used for testing software and hardware components of subscriber user devices that use telecommunication services provided by the wireless carrier network 102. For example, the diagnostic data may include system event reports, system bug reports, data traffic logs, data packet traces, Logcat data, PCAP data, and/or so forth. In other embodiments, the data may include analysis result data that are generated by analysis of network component test data stored in the database. Accordingly, the various types of data stored in the database 130 may be retrieved for presentation or analysis individually or in various combinations. For instance, the various types of data stored in the database 130 may be retrieved in combination to generate a news feed of network outage or network issues related to the wireless carrier network 102.

The database function command may specify the type of presentation, e.g., audio or visual, that is to be used for any results produced from the data. The command interpreter 126 may send the database function command to a database interface 132. For example, the database interface 132 may include one or more database application program interfaces (APIs), data adapters, etc. that are called by the database function command to perform one or more functions. The functions may include data processing functions, such as filtering, correlation, statistical analysis, machine-learning classification, modeling, and/or so forth. For example, the machine-learning classification may be performed using a naïve Bayes algorithm, a Bayesian network algorithm, a decision tree algorithm, a neural network algorithm, a support vector machine, and/or so forth. The functions may further include rendering functions that prepare the processed data for display, such as generation of results in the form of charts, graphs figures, models, schematics, maps, summaries, reports, logs, and/or so forth. Accordingly, the database interface 132 may deliver the results to the output controller 134 for rendering based on the presentation type specified in the data function command.

For example, in a scenario where the results include an audio presentation, the output controller 134 may activate the voice interface device 110 or another audio speaker device to present the audio presentation. The audio presentation may include synthesized speech 138 that narrate or report the results, audio clips of data that are stored in the databases 130, alert tones, background music, sound effects, and/or so forth. The synthesized speech 138 may be generated by a text-to-speech (TTS) algorithm of the output controller 134 or the voice interface device 110 that converts linguistic representations (e.g., text, numbers, etc.) into spoken words. In a scenario where the results include a visual presentation, the output controller 134 may activate a display device 140 to provide visualization 142 of the results. For example, the visualization may include charts, graphs, figures, models, schematics, maps, logs, and/or so forth. In some cases, the results may be presented via both audio and visual presentation. In some embodiments, the user 112 may input additional voice commands for performing functions such as view zoom in, view zoom out, display data filtering, display data overlay, view panning, view rotation, etc. with respect to the visualization 142. In another example, the visualizations may be integrated through other views for the purpose of delivering content, such as delivery through cloud-based team collaboration tools (e.g., Slack), delivery through email, delivery through messaging services, such as Short Message Service (SMS) messaging, Multimedia Messaging Service (MIMS) messaging, Rich Communication Services (RCS) messaging, and/or so forth.

In other embodiments, the command 128 may be an action command that prompts a network component or a device associated with the wireless carrier network 102 to perform a task. In such embodiments, the command interpreter 126 may send the action command to a controller interface 144. Accordingly, the controller interface 144 may direct the network component or device to perform the task. In various embodiments, the controller interface 144 may interact with network component or device via an application program interface (API), a command line interface (CLI), or an operating system shell of the network component or device. For example, the action command may cause a router or a gateway server of the wireless carrier network 102 to terminate service and then reboot. In another example, the action command may direct a base station of the wireless carrier network 102 to provide status details (e.g., frequency setting, power output, transmission rate, etc.). In additional example, the action command may cause test applications 146 on testing devices 148 to execute scripts that cause the test applications 146 to perform a series of actions in order to assess the performance of an application version. In some embodiments, a network component or a device that completes a task requested by the action command may automatically report status details to the controller interface 144.

In other embodiments, the action command may direct the network component or device to provide specific status details following the completion of the task. In some instances, the status details may be stored by the controller interface 144 in the databases 130. In other instances, the controller interface 144 may send the status details directly to the output controller 134 for presentation, as specified by the action command. The presentation may include audio that are presented by the voice interface device 110 and/or visual parts that are presented by the display device 140. For example, the audio parts may include the synthesized speech 138 that narrate or report the status details, audio clips of data that are generated, alert tones, background music, sound effects, and/or so forth. The visual parts may include charts, graphs, figures, models, schematics, maps, logs, and/or so forth.

In various embodiments, the mapping rules provided by the wireless carrier network to the intent mapping engine 120 may be periodically updated, such that persistent data representations may be mapped to different intermediate command representations. In other instances, a mapping rule provided by the wireless carrier network 102 that maps a persistent data representation to an intermediate command representation may be updated based on the number times that the intermediate command representation is invoked via inputted instances of the persistent data representation. For example, the command interpreter 126 may track the number of times that it receives a particular intermediate command representation as mapped to a specific persistent data representation. When the number of times meets a predetermined number threshold, the command interpreter 126 may send a new mapping rule to the intent mapping engine 120 that maps the specific persistent data representation to a new intermediate command representation instead of the particular intermediate command representation. Furthermore, the command interpreter 126 may update a corresponding intent translation rule in the translation database so that a data function command or an action command is associated with the new intermediate command representation instead of the particular intermediate command representation. These measures may provide additional security by ensuring that an operator of the intent mapping engine is not directly aware of the intended functionality of the commands that are being mapped with respect to the wireless carrier network.

While the VUI as illustrated in FIG. 1 is described within the context of the wireless carrier network 102, the use of VUI to control data analysis and system operations may be applicable to other implementations, networks, and/or systems. For example, the VUI may be used to obtain real-time stock quotes and place trade orders on the fly. In another example, the VUI may be used to monitor and control home automation devices. In additional examples, the use of VUI may be implemented with respect to databases and network components of other telecommunications networks, such as a PSTN, a land mobile radio system (LMRS), a satellite-based telecommunications network, etc.

Example Computing Device Components

Figure 2:
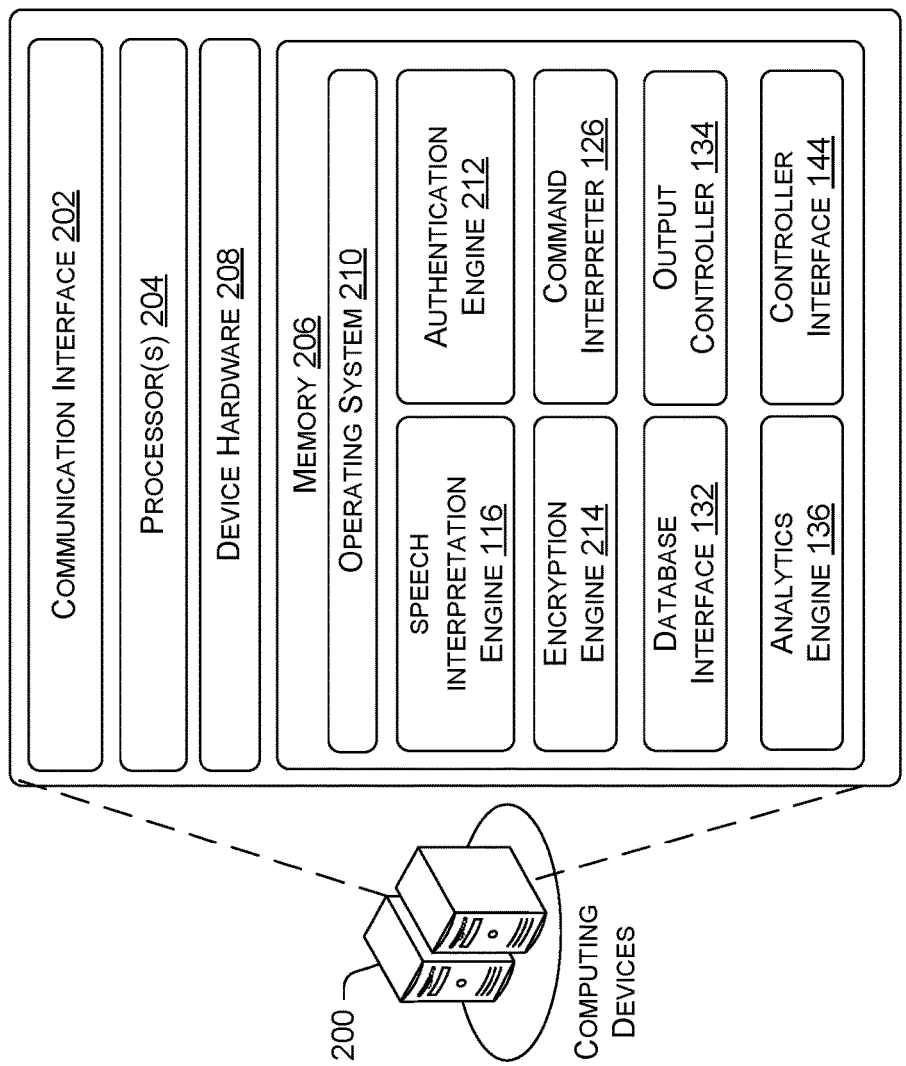
FIG. 2 is a block diagram showing various components of one or more illustrative computing devices that implements a voice user interface for data access and voice command control of network component in a wireless carrier network.

FIG. 2 is a block diagram showing various components of one or more illustrative computing devices 200 that implements a voice user interface for data access and voice command control of network component in a wireless carrier network. The computing devices 200 may include general purpose computers, such as desktop computers, tablet computers, laptop computers, servers, or other electronic devices that are capable of receive inputs, process the inputs, and generate output data. In other embodiments, the computing devices 200 or components thereof may be virtual computing devices in the form of virtual machines or software containers that are hosted in a computing cloud.

The computing devices 200 may include a communication interface 202, one or more processors 204, memory 206, and hardware 208. The communication interface 202 may include wireless and/or wired communication components that enable the computing devices 200 to transmit data to and receive data from other networked devices. The hardware 208 may include additional hardware interface, data communication, or data storage hardware. For example, the hardware interfaces may include a data output device (e.g., visual display, audio speakers), and one or more data input devices. For example, the hardware interfaces may include an integrated voice interface device 138. The data input devices may include, but are not limited to, combinations of one or more of keypads, keyboards, mouse devices, touch screens that accept gestures, microphones, voice or speech recognition devices, and any other suitable devices.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission or non-transitory medium that can be used to store information for access by a computing device. In contrast, communication media may embody computer-readable instructions, data structures, program modules, or other data in a modulated data signal, such as a carrier wave, or other transmission mechanism.

The processors 204 and the memory 206 of the computing devices 200 may implement an operating system 210. The operating system 210 may include components that enable the computing devices 200 to receive and transmit data via various interfaces (e.g., user controls, communication interface, and/or memory input/output devices), as well as process data using the processors 204 to generate output. The operating system 210 may include a presentation component that presents the output (e.g., display the data on an electronic display, store the data in memory, transmit the data to another electronic device, etc.). For example, the output controller 134 may be a part of the operating system 210. Additionally, the operating system 210 may include other components that perform various additional functions generally associated with an operating system.

The computing devices 200 may implement the speech interpretation engine 116, the command interpreter 126, the output controller 134, the analytics engine 136, the controller interface 144, as well as an authentication engine 212 and an encryption engine 214. Each of these components may include routines, program instructions, objects, and/or data structures that perform particular tasks or implement particular abstract data types. The authentication engine 212 may authenticate a user so that the user may create or log into a user account to use the VUI. In various embodiments, the authentication engine 212 may prompt a user to enter an authentication credential for a corresponding user account. The authentication credential may include one or more of a user name, a password, an electronic identifier, a digital certificate, biometric characteristics, and/or the like. In turn, the authentication engine 212 may compare the inputted authentication credential to a list of authorize authentication credentials for user accounts stored by an authentication service of the wireless carrier network 102. Alternatively, the authentication engine 212 may send the authentication to an authentication server of a third-party authenticator for authentication. Accordingly, the authentication engine 212 may permit the user access to the VUI when the inputted authentication credential is verified by the authentication service or the authentication server.

The encryption engine 214 may work with an encryption service of the intent mapping engine 120 as operated by a third-party service provider to ensure that the data exchanged between the different entities are encrypted. In various embodiments, the encryption engine 214 may encrypt outgoing data and decrypted incoming data using various encryption schemes. For example, the encryption may be implemented using various asymmetric and symmetric encryption techniques such as public key infrastructure (PKI) key negotiation and encryption, Diffie-Hellman key exchange, and/or so forth. In some instances, the encryption engine 214 may also implement hash-based techniques to specify and verify the authenticity of the data that are exchanged between the entities. For example, the hash-based techniques may include the use of MD5 hashing, SHA-1 hashing, and/or so forth, to generate keyed-hash message authentication codes (HMAC).

In some embodiments, the database interface 132 or the controller interface 144 may request confirmation prior to performing critical actions. The critical actions may be stored in a database that is maintained and updated by the operator of the wireless carrier network 102. The critical actions may include actions that disrupt the ability of the wireless carrier network to provide telecommunication services. For example, an action to delete data from the home location register (HLR) or the home subscriber server (HSS) may trigger the controller interface 144 to request confirmation prior to executing the action. In another example, an action to shut down or reboot certain services or network component of the wireless carrier network, such as a router or a server, may trigger the database interface 132 or the controller interface 144 to request confirmation prior to executing the action. The confirmation request may include the database interface 132 or the controller interface 144 requesting via the voice interface device 110 or the display device 140 for a user to make an affirmative input to signal intent to proceed with the action. For example, the affirmative input may be in the form of a speech input that is received by the voice interface device 110. In another example, the affirmative input may be a gesture that is captured via a camera, a keyboard, a touchpad, a mouse, and/or another user interface device. In some instances, the database interface 132 or the controller interface 144 may trigger the authentication engine 212 to request authentication credentials along with the confirmation. In such instances, the controller interface 144 may be configured to process the affirmative input to trigger the execution of a command following the input of valid authentication credentials.

The VOI as illustrated in FIGS. 1 and 2 may have application in multiple scenarios. For example, the VOI may be used to ascertain an average launch time for a user device application that is being tested on multiple testing devices. In another example, the VOI may be used to determine the performance (e.g., memory usage, the number of disk reads, writes, etc.) that are performed by various network components of the wireless carrier network 102. In an additional example, the VOI may be used to control a continuous integration pipeline through commands for starting new builds, requesting the status of builds, auto-scale server nodes based on data processing loads, load balance between multiple server nodes, redirecting traffic between multiple server nodes, etc. In further examples, the VOI may be used to request the execution of network analytic tests (e.g., data packet traces, QoE diagnostics, etc.) for different geographical areas, and filtering of the results of the analytics tests for a geographical area, device identifiers, device manufacturers, device configuration settings, and/or so forth.

In other examples, the VOI may be deployed at brick-and-mortar retail stores of the wireless carrier network 102, such that the customers may interact with the VOI through a voice interface device to obtain services. In such examples, the customers may use the VOI to make account balance inquiries, pay bills, order upgraded or new devices, request network service coverage information for different geographical areas, and/or so forth. In still other examples, multiple VOIs may be used in conjunction to enable multiple users to collaborate on the control of the processing and display data, control of network components of wireless carrier network, control tasks that are performed by the devices that are associated with the wireless carrier network 102. The collaboration may be performed by the users at a single location or at multiple remote locations. In other instances, the visualization and the synthesized speech that are presented, and/or the voice commands that triggered the presentation, may be recorded by a recording function of the output controller 134 for later replay and analysis. Additional details regarding the functionalities of the components of the VOI as shown in FIG. 2 are discussed in the context of FIGS. 3-8.

Example Processes

FIGS. 3-8 present illustrative processes 300-800 for deploying a voice user interface for data access and voice command control of network components in a wireless carrier network. Each of the processes 300-800 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 300-800 are described with reference to the architecture 100 of FIG. 1.

Figure 3:
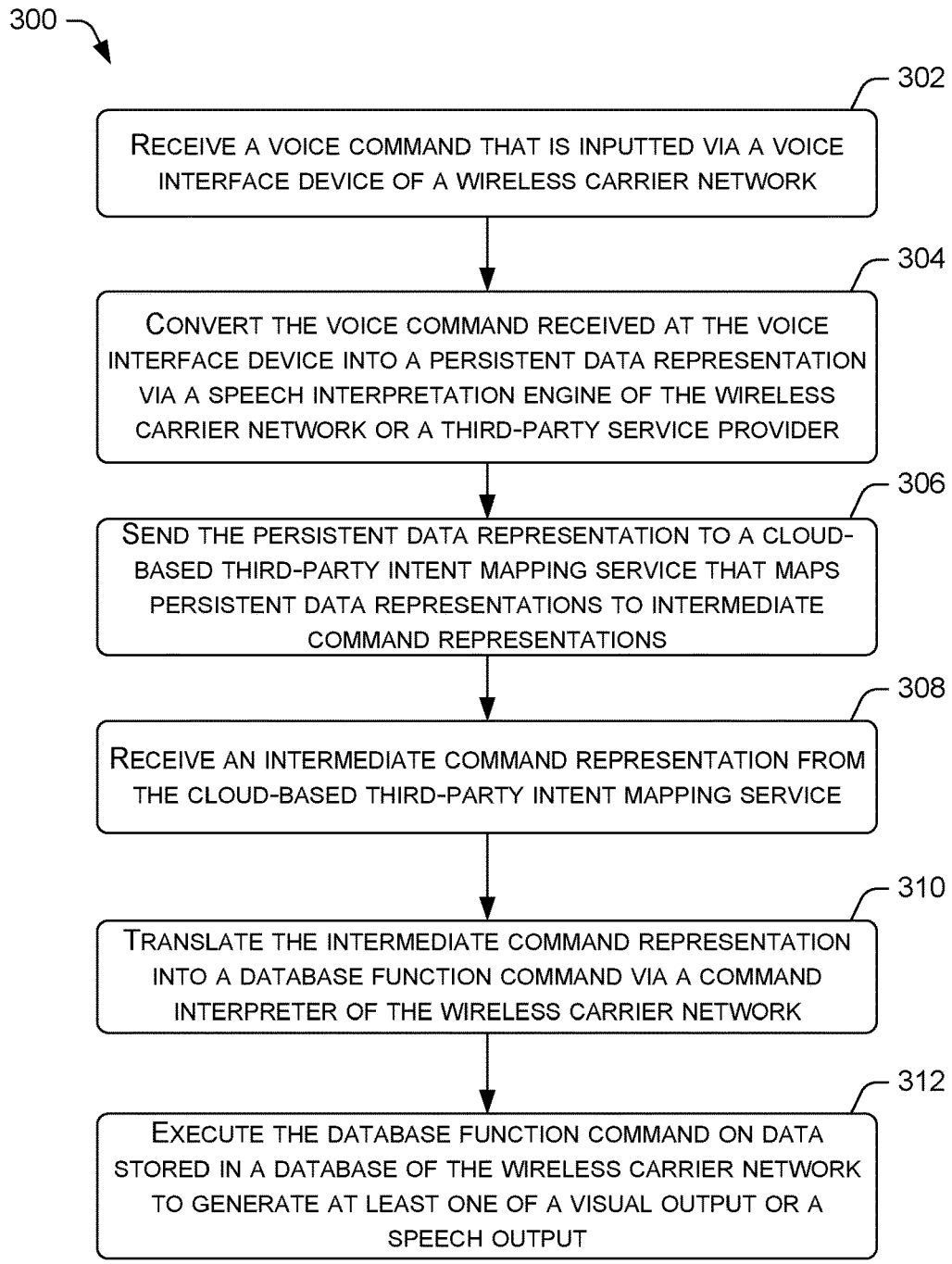
FIG. 3 is a flow diagram of an example process for processing and executing a voice command on data stored in one or more databases of a wireless carrier network.

FIG. 3 is a flow diagram of an example process 300 for processing and executing a voice command on data stored in one or more databases of a wireless carrier network. At block 302, the wireless carrier network 102 may receive a speech input via a voice interface device 110. For example, the speech input may be spoken by a user 112. The speech input may contain a command for accessing data stored in databases of the wireless carrier network 102 or control components and associated devices of the network.

At block 304, a speech interpretation engine 116 of the wireless carrier network 102 may convert the voice command received at the voice interface device 110 into a persistent data representation 118. In various embodiments, the speech interpretation engine 116 may be operated by the wireless carrier network 102 or a third-party service provider. At block 306, the speech interpretation engine 116 may send the persistent data representation 118 to an intent mapping engine 120. The intent mapping engine 120 may be operated by a cloud-based third-party intent mapping service provider to map persistent data representations to intermediate command representations. In some alternative instances, the intent mapping engine 120 may be operated by the wireless carrier network 102. The intent mapping engine 120 may map the persistent data representation to the intermediate command representation 124.

At block 308, the command interpreter 126 of the wireless carrier network 102 may receive the intermediate command representation 124 from the intent mapping engine 120 that is operated by the third-party intent mapping service provider. In alternative embodiments, the command interpreter 126 may receive the intermediate command representation from an intent mapping engine 120 that is operated by the wireless carrier network 102. At block 310, the command interpreter 126 may translate the intermediate command representation 124 into a database function command. In various embodiments, the database function command may cause a database interface to process data in the databases of the wireless carrier network, and/or retrieve data from the databases for presentation. The presentation may be in the form of synthesized speech that is outputted by an audio speaker of the voice interface device. Alternatively or concurrently, the presentation may take the form of data visualization that is presented on a display device. At block 312, the command interpreter 126 may pass the database function command to the database interface 132 for execution on data stored in a database of the wireless carrier network 102. Accordingly, the execution may generate at least one of a visual output or a speech output.

Figure 4:
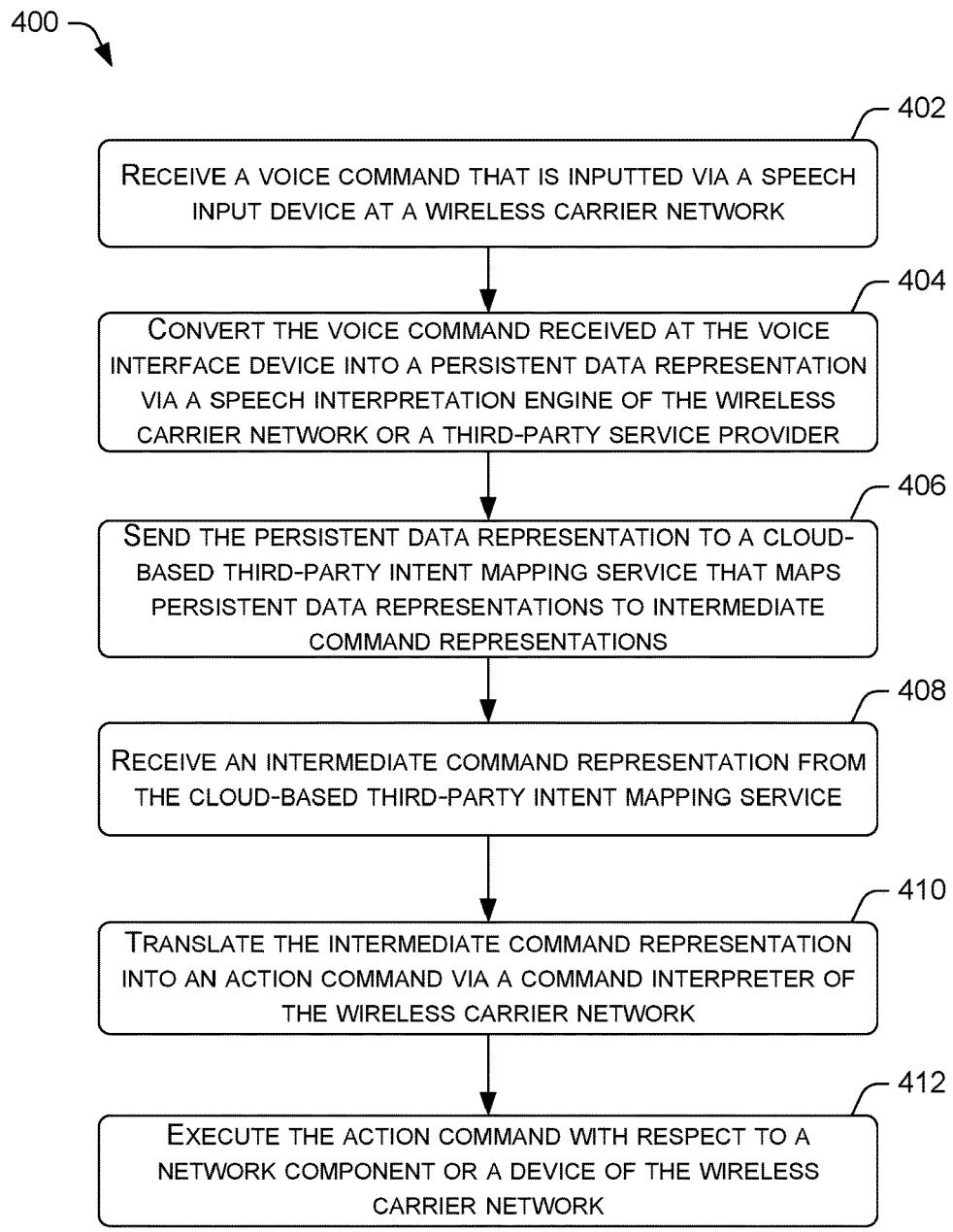
FIG. 4 is a flow diagram of an example process for processing and executing a voice command with respect to a network component of the wireless carrier network.

FIG. 4 is a flow diagram of an example process 400 for processing and executing a voice command with respect to a network component of the wireless carrier network. At block 402, the wireless carrier network 102 may receive a speech input via a voice interface device 110. For example, the speech input may be spoken by a user 112. The speech input may contain a command for accessing data stored in databases of the wireless carrier network 102 or control components and associated devices of the network.

At block 404, a speech interpretation engine 116 of the wireless carrier network 102 may convert the voice command received at the voice interface device 110 into a persistent data representation 118. In various embodiments, the speech interpretation engine 116 may be operated by the wireless carrier network 102 or a third-party service provider. At block 406, the speech interpretation engine 116 may send the persistent data representation 118 to an intent mapping engine 120. The intent mapping engine 120 may be operated by a cloud-based third-party intent mapping service provider to map persistent data representations to intermediate command representations. Alternatively, the intent mapping engine 120 may be operated by the wireless carrier network 102. The intent mapping engine may map the persistent data representation to the intermediate command representation 124.

At block 408, the command interpreter 126 of the wireless carrier network 102 may receive the intermediate command representation 124 from the intent mapping engine 120 that is operated by the third-party intent mapping service provider. In alternative embodiments, the command interpreter 126 may receive the intermediate command representation from an intent mapping engine 120 that is operated by the wireless carrier network 102. At block 410, the command interpreter 126 may translate the intermediate command representation 124 into an action command. In various embodiments, the action command may cause network components or associated devices of the wireless carrier network to perform tasks. For example, the tasks may include stopping and restarting a network component or initiating software testing for an application that is installed on multiple testing devices. Some of the tasks may include presenting information via synthesized speech that is outputted by the voice interface device and/or data visualization that is presented via a display device. At block 412, the command interpreter 124 may pass the action command to a controller interface 144 for execution. In turn, the controller interface 144 may execute the action command with respect to one or more network components, one or more test devices of the wireless carrier network 102, or one or more user devices that are using the communications services provided by the wireless carrier network 102. For example, the action command may push a firmware update to one or more user devices that are using the communication services provided by the wireless carrier network 102.

Figure 5:
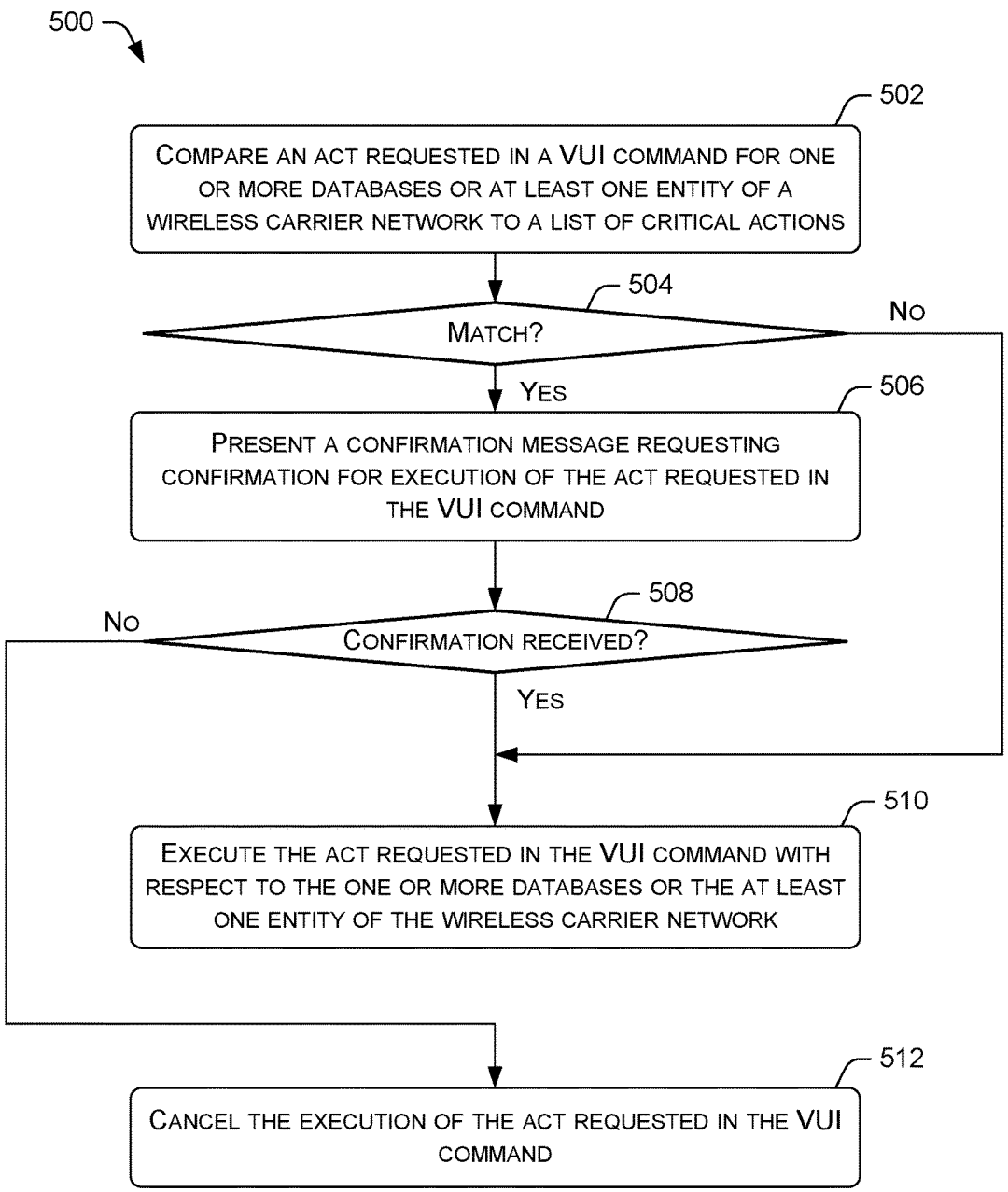
FIG. 5 is a flow diagram of an example process for requesting a confirmation prior to executing a voice command that is inputted via a speech input device.

FIG. 5 is a flow diagram of an example process 500 for requesting a confirmation prior to executing a voice command that is inputted via a speech input device. At block 502, the database interface 132 or the controller interface 144 may compare an act requested in a VUI command for one or more databases or at least one entity of a wireless carrier network 102 to a list of critical actions. In various embodiments, the entities of the wireless carrier network may include network components of the wireless carrier network 102, testing devices associated with the wireless carrier network 102, or user devices that are using the communication services provided by the wireless carrier network 102.

At decision block 504, the database interface 132 or the controller interface 144 may determine whether the act matches an action in the list of critical actions. Accordingly, if the act matches an action in the list of critical actions ("yes" at decision block 504), the process 500 may proceed to block 506. At block 506, the database interface 132 or the controller interface 144 may present a confirmation message requesting confirmation for execution of the act requested in the VUI command. In various embodiments, the confirmation request may include the database interface 132 or the controller interface 144 requesting via the voice interface device 110 or the display device 140 for a user to make an affirmative input to signal intent to proceed with the action.

At decision block 508, the database interface 132 or the controller interface 144 may determine whether a confirmation is received. For example, the confirmation may be in the form of a speech input that is received by the voice interface device 110. In another example, the confirmation may be a gesture or act that is captured via a camera, a keyboard, a touchpad, a mouse, and/or another user interface device. Accordingly, if the database interface 132 or the controller interface 144 determines that a confirmation is received ("yes" at decision block 508), the process 500 may proceed to block 510. At block 510, the database interface 132 or the controller interface 144 may execute the act requested in the VUI command with respect to the one or more databases or the at least one entity of the wireless carrier network 102.

Returning to decision block 504, if the act does not match an action in the list of critical actions ("no" at decision block 504), the process 500 may proceed directly to block 510. Returning to decision block 508, if the database interface 132 or the controller interface 144 determines that no confirmation is received ("no" at decision block 508), the process 500 may proceed to block 512. At block 512, the database interface 132 or the controller interface 144 may cancel the execution of the act requested in the VUI command.

Figure 6:
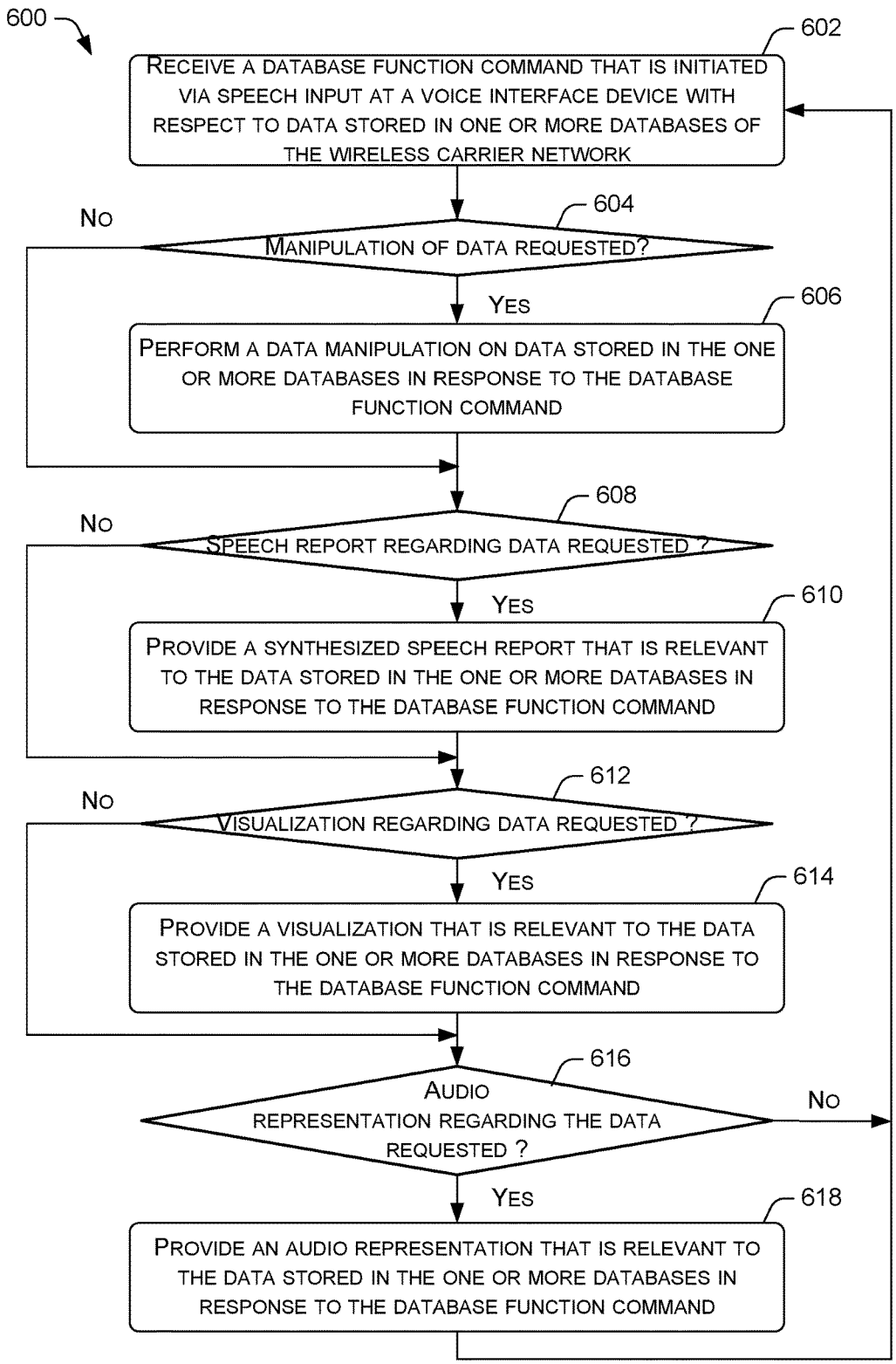
FIG. 6 is a flow diagram of an example process for performing various functions with respect to a database of a wireless carrier network in response to voice commands.

FIG. 6 is a flow diagram of an example process 600 for performing various functions with respect to a database of a wireless carrier network in response to voice commands. At block 602, the database interface 132 may receive a database function command that is initiated via a speech input at a voice interface device. The data function command may request the performance of an action with respect to data stored in one or more databases of the wireless carrier network 102. At decision block 604, if the data function command requests the manipulation of data ("yes" at decision block 604), the process 600 may proceed to block 606.

At block 606, the database interface 132 may perform a data manipulation on data stored in the one or more databases of the wireless carrier network 102. In various some embodiments, the manipulation may include a data creation operation, a data read operation, a data update operation, and/or a data deletion operation. In other embodiments, the manipulation may include the application of an analytics algorithm, such as the application of a statistical algorithm, a machine-learning algorithm, or a deep belief network algorithm to generate analytical results by the analytics engine 136. In still additional embodiments, the manipulation may include the cross referencing of data in multiple databases, generating extrapolations of data, generating predictions based on the data, and/or so forth. Subsequently, the process 600 may proceed to decision block 608.

However, if the data function command does not request the manipulation data ("no" at decision block 604), the process 600 may proceed directly to decision block 608. At decision block 608, if a speech report is requested by the database function command, the process 600 may proceed to block 610. At block 610, the database interface 132 may prompt the output controller 134 provide a synthesized speech report that is relevant to the data stored in the one or more databases of the wireless carrier network 102 in response to the data function command. For example, the synthesized speech report may provide analysis results regarding the data, output data that is generated based on the data, a specific data entry stored in the database, or an indication that a manipulation of the data is performed. Subsequently, the process 600 may proceed to decision block 612.

However, if the data function command does not request a speech report ("no" at decision block 608), the process 600 may proceed directly to decision block 612. At decision block 612, if a visualization regarding the data is requested by the database function command, the process 600 may proceed to block 614. At block 614, the database interface 132 may prompt the output controller 134 to provide a visualization that is relevant to the data stored in the one or more databases of the wireless carrier network 102 in response to the database function command. For example, the visualization may include charts, graphs, figures, models, schematics, maps, data logs, and/or so forth that present one or more portions of the data or analytic results that are generated based on the data. Subsequently, the process 600 may proceed to decision block 616.

However, if the data function command does not request a visualization ("no" at decision block 612), the process 600 may proceed directly to decision block 616. At decision block 616, if an audio representation regarding the data is requested by the database function command, the process 600 may proceed to block 618. At block 618, the database interface 132 may prompt the output controller 134 to provide an audio representation that is relevant to the data stored in the one or more databases of the wireless carrier network 102 in response to the database function command. For example, the audio representation may include alert tones, background music, sound effects, sample audio files that highlight performance issues, and/or so forth. Subsequently, the process 600 may loop back to block 602. However, if the data function command does not request an audio representation ("no" at decision block 616), the process 600 may directly loop back to block 602.

Figure 7:
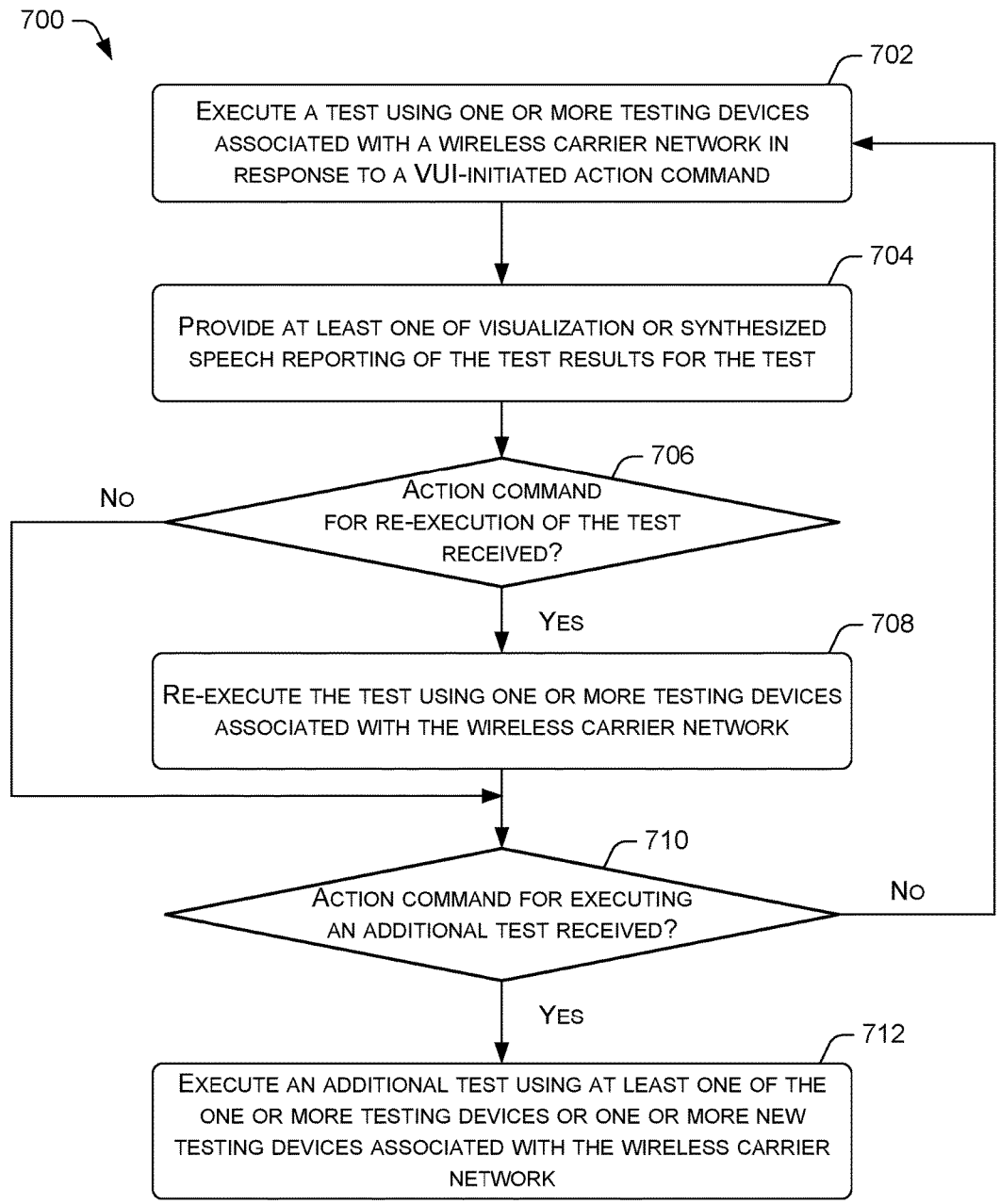
FIG. 7 is a flow diagram of an example process for performing various test actions using one or more testing devices associated with a wireless carrier network in response to voice commands.

FIG. 7 is a flow diagram of an example process 700 for performing various test actions using one or more testing devices associated with a wireless carrier network in response to voice commands. At block 702, the controller interface 144 may execute a test using one or more testing devices associated with the wireless carrier network 102 in response to an action command that is initiated via a VUI command input. For example, the testing devices may be configured to use the telecommunication services provided by the wireless carrier network 102. In some instances, the test may include executing an application or other software components on the one or more testing devices to assess the performance of the application. Such application or software components may have been developed by the operator of the wireless carrier network 102. In other instances, the test may include performing a series of actions (e.g., dial a call, open a browser, download a web page, etc.) using the one or more testing devices to assess the performance of the hardware components in the testing devices.

At block 704, the controller interface 144 may prompt the output controller 134 to provide at least one of visualization or synthesized speech reporting of the test results for the test. The visualization may be in the form of charts, graphs figures, models, schematics, maps, summaries, reports, logs, and/or so forth. The synthesized speech may include narration of test results, the generation of alert tones for test result values that fall outside predetermined value thresholds, sample audio data relevant to the test results, and/or so forth. In some embodiments, the test results may include suggestions or recommendations for the performance of other tests, such as a re-execution of the same test or execution of another type of test.

At decision block 706, the controller interface 144 may determine whether an action command for re-execution of the test, as initiated via the VUI command input, is received. Accordingly, if such an action command is received ("yes" at decision block 706), the process 700 may proceed to block 708. At block 708, the controller interface 144 may re-execute the test using one or more testing devices associated with the wireless carrier network 102 in response to an action command that is initiated via a VUI command input. Subsequently, the test results may be once again presented via at least one of visualization or synthesized speech reporting. In some embodiments, the test results may include suggestions or recommendations for the performance of other tests, such as a re-execution of the same test or execution of another type of test.

At decision block 710, the controller interface 144 may determine whether an action command for executing an additional test, as initiated via the VUI command input, is received. Accordingly, if such an action command is received ("yes" at decision block 710), the process 700 may proceed to block 712. At block 712, the controller interface 144 may execute an additional test using at least one of the one or more testing devices or one or more new testing devices associated with the wireless carrier network 102. The additional test may be a new test that differ in nature from the test that is executed in block 702. In alternative embodiments, the additional test may be a test that is executed on one or more network components of the wireless carrier network as described in example process 800, or executed on one or more user device that are using the communication services provided by the wireless carrier network 102. Subsequently, the test results may be once again presented via at least one of visualization or synthesized speech reporting.

Returning to decision block 706, if no action command for re-execution of the test is received ("no" at decision block 706), the process 700 may proceed directly to decision block 710. At decision block 710, if no action command for executing an additional test is received ("no" at decision block 710), the process 700 may loop back to block 702.

Figure 8:
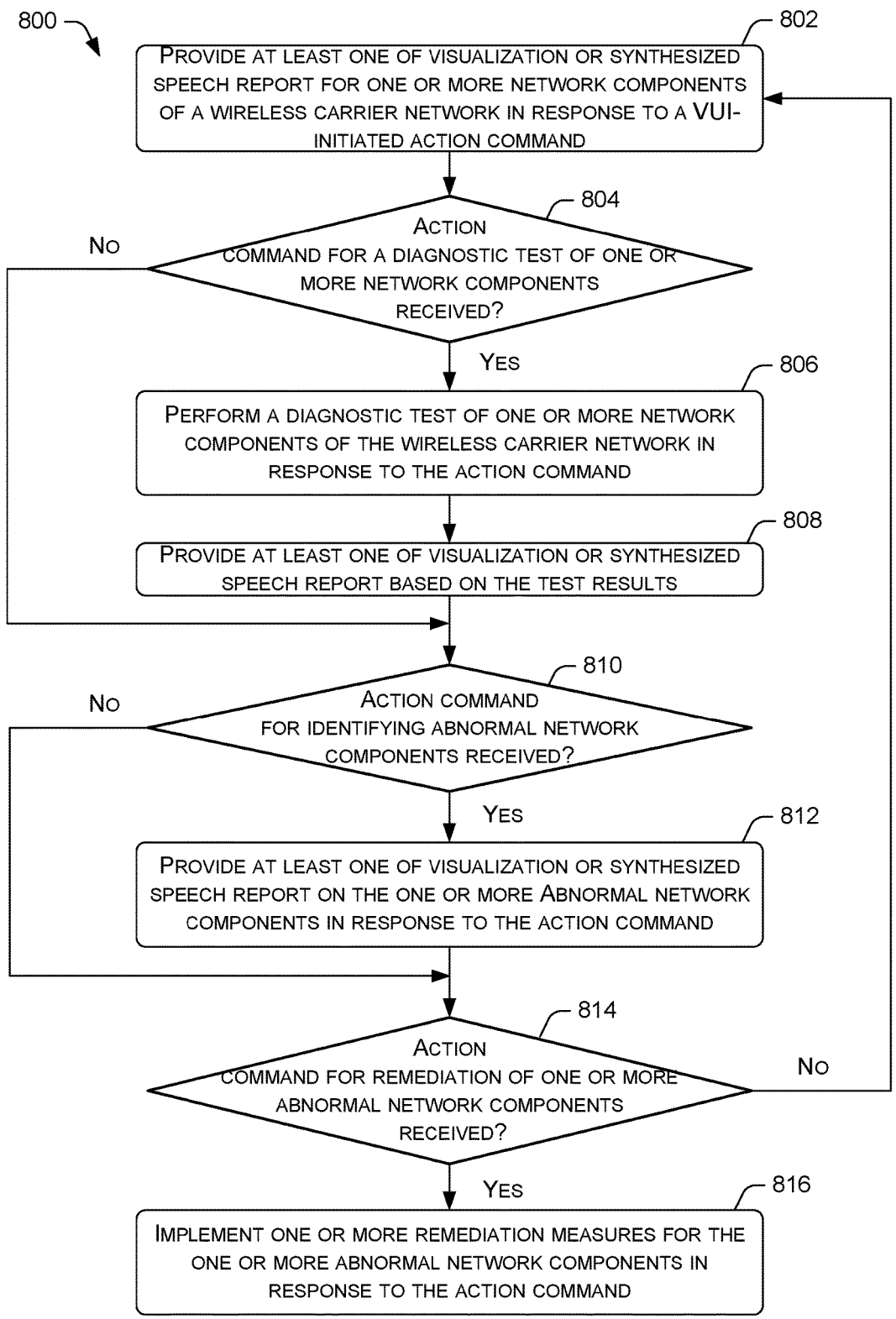
FIG. 8 is a flow diagram of an example process for performing various functions with respect to network components of the wireless carrier network in response to voice commands.

FIG. 8 is a flow diagram of an example process 800 for performing various functions with respect to network components of the wireless carrier network in response to voice commands. At block 802, the output controller 134 may provide at least one of visualization or synthesized speech report for one or more network components of a wireless carrier network 102 in response to a VUI-initiated action command. The visualization may be in the form of charts, graphs figures, models, schematics, maps, summaries, reports, logs, and/or so forth. The synthesized speech status report may include narration of test results, the generation of alert tones, sample audio data, and/or so forth.

At decision block 804, the command interpreter 126 may determine whether an action command for performing a diagnostic test of one or more network components is received. Accordingly, if the action command for a diagnostic test is received ("yes" at decision block 804), the process 800 may proceed to block 806. At block 806, the command interpreter 126 may prompt the analytic engine 136 to perform a diagnostic test of one or more network components of the wireless carrier network 102 in response to the action command. In various embodiments, the diagnostic test may include a functionality test, an availability test, a QoE test, a performance test, a validation test, and/or so forth, that assess whether performance parameters of network component meet predetermined corresponding performance thresholds. At block 808, the output controller 134 may provide at least one of visualization or synthesized speech reporting based on the test results. The visualization may be in the form of charts, graphs figures, models, schematics, maps, summaries, reports, logs, and/or so forth. The synthesized speech report may include narration of test results, the generation of alert tones, sample audio data, and/or so forth.

At decision block 810, the command interpreter 126 may determine whether an action command for identifying one or more abnormal network components is received. Accordingly, if the action command for identifying one or more abnormal network components is received ("yes" at decision block 810), the process 800 may proceed to block 812. At block 812, the command interpreter 126 may prompt the analytics engine 136 to identify one or more abnormal network component. In various embodiments, a network component may be identified by the analytics engine 136 as abnormal when at least one performance parameter of the network component fails to meet a corresponding performance threshold. Accordingly, the analytics engine 136 may prompt the output controller 134 to provide at least one of visualization or synthesized speech reporting on the one or more abnormal network components. The visualization may be in the form of charts, graphs figures, models, schematics, maps, summaries, reports, logs, and/or so forth. The synthesized speech report may include narration of test results, the generation of alert tones, sample audio data, and/or so forth.

At decision block 814, the command interpreter 126 may determine whether an action command for remediation of the one or more abnormal network components is received. Accordingly, if the action command for remediation is received ("yes" at decision block 814), the process 800 may proceed to block 816. At block 816, the controller interface 144 may implement one or more remediation measures for the one or more abnormal network components in response to the action command. In various embodiments, the remediation measures may include the rebooting of a network component, a purging and/or reloading of a configuration file or other data stored in a memory of the network component from a backup source, an execution of a virus scan software or security lockdown software, a factory reset of the network component, and/or so forth.

Returning to decision block 804, if the action command for the diagnostic test is not received, the process 800 may proceed directly to decision block 810. At decision block 810, if the action command for identifying one or more abnormal network components is not received, the process 800 may proceed to decision block 814. At decision block 814, if the action command for remediation is not received ("no" at decision block 814), the process 800 may loop back to block 802.

The use of VUI for data access and voice command control of network components in a wireless carrier network may benefit network engineers, management staff, marketing staff, and customer service representatives of the wireless carrier network. For example, the use of VUI may enable these personnel to understand operational details and performance metrics regarding the wireless carrier network efficiently, as well as initiate troubleshooting and remediation of network errors, without having to acquire, customize, and/or learn the use of complex troubleshooting and dashboard software tools. In this way, personnel of the wireless carrier network are able to quickly acquire the precise pieces of information they desire for reporting and troubleshooting purposes. Additionally, in some scenarios, the marketing staff may use information that are provided by the VUI to gauge the stability of the wireless carrier network for launching a product or service. As a result, the use of VUI may reduce computation load on the servers of the wireless carrier network by eliminating unnecessary collection, processing, and display of data, unwanted termination and re-initialization of network processes and components, and/or so forth. In some instances, selective access to the VUI may also be provided to customers to enable customers to obtain customer account information or certain network status updates regarding the wireless carrier network.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. One or more non-transitory computer-readable media storing computer-executable instructions that upon execution cause one or more processors to perform acts comprising:
   converting a voice command received at a voice interface device connected to a telecommunications network into a persistent data representation via a speech interpretation engine;
   sending the persistent data representation to a third-party intent mapping service that maps persistent data representations to intermediate command representations;
   receiving an intermediate command representation that is generated from the persistent data representation of the voice command by the third-party intent mapping service at a command interpreter of the telecommunications network;
   translating, via the command interpreter of the telecommunications network, text of the intermediate command representation into a database function command, in which the intermediate command representation is defined by the telecommunications network to represent the database function command, and the database function command has a text command definition that is unknown to the third-party intent mapping service that generated the intermediate command representation; and
   executing the database function command on data stored in a database of the telecommunications network via a database interface to generate at least one of a synthesized speech output presented by the voice interface device or a visual output presented by a display device.

2. The one or more non-transitory computer-readable media of claim 1, wherein the acts further comprise:
   determining a number of times that the intermediate command representation is received at the command interpreter of the telecommunications network; and
   directing the third-party intent mapping service to map the persistent data representation to a new intermediate command representation in response to the number of times meeting a predetermined number threshold.

3. The one or more non-transitory computer-readable media of claim 1, wherein the translating includes using an intent translation rule in a translation database of the telecommunications network to translate the intermediate command representation into the database function command.

4. The one or more non-transitory computer-readable media of claim 1, wherein the executing the database function command includes at least one of:
    performing a data manipulation on the data stored in the database of the telecommunications network in response to the database function command;
    providing a synthesized speech report that is relevant to the data stored in the database of the telecommunications network in response to the database function command;
    providing a visualization that is relevant to the data stored in the database of the telecommunications network in response to the database function command; or
    providing an audio representation that is relevant to the data stored in the database of the telecommunications network in response to the database function command.

5. The one or more non-transitory computer-readable media of claim 4, wherein the performing the data manipulation includes at least one of creating the data, reading the data, updating the data, or deleting the data, applying an analytic algorithm to the data, generating extrapolations based on the data, generating predictions based on the data, or cross referencing the data with additional data stored in an additional database.

6. The one or more non-transitory computer-readable media of claim 4, wherein the providing the synthesized speech report includes reporting at least one of a specific data entry stored in the database, a report that the data manipulation is performed, analysis results regarding the data, or output data that is generated based on the data via an audio speaker of the voice interface device.

7. The one or more non-transitory computer-readable media of claim 4, wherein the providing the visualization includes displaying at least one of a chart, a graph, a figure, a model, a schematic, a map, or a data log for the data on a display device.

8. The one or more non-transitory computer-readable media of claim 7, wherein the acts further comprise performing at least one of view zoom, view panning, view rotation, display data filtering, or display data overlay in response to an additional voice command.

9. The one or more non-transitory computer-readable media of claim 4, wherein the providing the audio representation includes providing at least one of alert tones, background music, or sound effects.

10. The one or more non-transitory computer-readable media of claim 1, wherein the database stores at least one of network data regarding technical and operational status of the telecommunication network, device data regarding technical capabilities, feature settings, and operational status of user devices, account data that includes account details associated with the user devices, metrics data on performance of network hardware and software components of the telecommunications network, or diagnostic data that are generated by testing devices that use telecommunication services provided by the telecommunications network, or analysis result data that are generated by analysis of network component test data stored in the database.

11. The one or more non-transitory computer-readable media of claim 1, wherein the voice interface device is a smart speaker that is configured to provide virtual assistant functionalities.

12. A computer-implemented method, comprising:
    receiving, at a voice interface device connected to a wireless carrier network, a voice command spoken by a user;
    converting, via a speech interpretation engine, the voice command into a persistent data representation;
    sending the persistent data representation to a third-party intent mapping service that maps persistent data representations to text intermediate command representations, the text intermediate command representations are defined by the wireless carrier network to represent database function commands, and text command definitions of the database function commands as defined by the wireless carrier network are unknown to the third-party intent mapping service;
    receiving, from the third-party intent mapping service, a text intermediate command representation at a command interpreter of the wireless carrier network;
    translating, via the command interpreter of the wireless carrier network, the text intermediate command representation into a database function command with a text command definition that is unknown to the third-party intent mapping service; and
    executing, via a database interface of the wireless carrier network, the database function command on data stored in a database of the wireless carrier network to generate at least one of a synthesized speech output presented by the voice interface device or a visual output presented by a display device.

13. The computer-implemented method of claim 12, wherein the translating includes using an intent translation rule in a translation database of the wireless carrier network to translate the text intermediate command representation into the database function command.

14. The computer-implemented method of claim 12, wherein the executing includes executing the database function command following a confirmation input that is received via the voice interface device.

15. The computer-implemented method of claim 12, wherein the executing the database function command includes at least one of:
    performing a data manipulation on the data stored in the database of the wireless carrier network in response to the database function command;
    providing a synthesized speech report that is relevant to the data stored in the database of the wireless carrier network in response to the database function command;
    providing a visualization that is relevant to the data stored in the database of the wireless carrier network in response to the database function command; or
    providing an audio representation that is relevant to the data stored in the database of the wireless carrier network in response to the database function command.

16. The computer-implemented method of claim 15, wherein the performing the data manipulation includes at least one of creating the data, reading the data, updating the data, or deleting the data, applying an analytic algorithm to the data, generating extrapolations based on the data, generating predictions based on the data, or cross referencing the data with additional data stored in an additional database.

17. The computer-implemented method of claim 15, wherein the providing the synthesized speech report includes reporting at least one of a specific data entry stored in the database, a report that the data manipulation is performed, analysis results regarding the data, or output data that is generated based on the data via an audio speaker of the voice interface device.

18. The computer-implemented method of claim 15, wherein the providing the visualization includes displaying at least one of a chart, a graph, a figure, a model, a schematic, a map, or a data log for the data on a display device, and wherein providing the audio representation includes providing at least one of alert tones, background music, or sound effects.

19. A system, comprising:
one or more processors; and
memory including a plurality of computer-executable components that are executable by the one or more processors to perform a plurality of actions, the plurality of actions comprising:
converting a voice command received at a voice interface device connected to a wireless carrier network into a persistent data representation via a speech interpretation engine;
sending the persistent data representation to a third-party intent mapping service that maps persistent data representations to intermediate command representations;
receiving an intermediate command representation that is generated from the persistent data representation of the voice command by the third-party intent mapping service at a command interpreter of the wireless carrier network;
translating, via the command interpreter of the wireless carrier network, text of the intermediate command representation into a database function command via the command interpreter using an intent translation rule in a translation database of the wireless carrier network, in which the intermediate command representation is defined by the wireless carrier network to represent the database function command, and the database function command has a text command definition that is unknown to the third-party intent mapping service that generated the intermediate command representation; and
executing the database function command on data stored in a database of the wireless carrier network via a database interface to generate at least one of a synthesized speech output presented by the voice interface device or a visual output presented a display device.

20. The system of claim 19, wherein the voice interface device is a smart speaker that is configured to provide virtual assistant functionalities.

* * * * *